US006807803B2

(12) United States Patent
Poccia et al.

(10) Patent No.: US 6,807,803 B2
(45) Date of Patent: Oct. 26, 2004

(54) GAS TURBINE EXHAUST DIFFUSER

(75) Inventors: Nicholas Philip Poccia, Geneevoort, NY (US); Franklin Timothy Wendell, Fonda, NY (US); Jacques Leo Amyot, Albany, NY (US); Carlos Serafim Albuquerque Fernandes, Albany, NY (US); Laurence Ambrose Kenny, III, Rindge, NH (US)

(73) Assignee: General Electric Company, Schenectady, NY (US)

( * ) Notice: Subject to any disclaimer, the term of this patent is extended or adjusted under 35 U.S.C. 154(b) by 55 days.

(21) Appl. No.: 10/310,853

(22) Filed: Dec. 6, 2002

(65) Prior Publication Data

US 2004/0107690 A1 Jun. 10, 2004

(51) Int. Cl.[7] .................................................. F02C 3/00
(52) U.S. Cl. .......................................... 60/39.5; 60/798
(58) Field of Search ........................ 60/798, 800, 796, 60/799, 39.5, 39.182

(56) References Cited

U.S. PATENT DOCUMENTS

| 2,516,819 | A | * | 7/1950 | Whittle ......................... 60/796 |
| 2,544,538 | A | * | 3/1951 | Mahnken ....................... 60/800 |
| 3,764,226 | A | * | 10/1973 | Matto ......................... 415/214.1 |
| 4,802,821 | A | * | 2/1989 | Krietmeier ................. 415/208.2 |
| 5,069,034 | A | * | 12/1991 | Jourdain et al. ............... 60/798 |
| 5,077,967 | A | | 1/1992 | Widener et al. |
| 5,088,775 | A | | 2/1992 | Corsmeier et al. |
| 5,658,024 | A | * | 8/1997 | Bachmann et al. .......... 285/299 |
| 5,669,812 | A | | 9/1997 | Schockemoehl et al. |
| 5,778,658 | A | | 7/1998 | Lamando, Jr. et al. |
| 6,065,756 | A | | 5/2000 | Eignor et al. |

* cited by examiner

Primary Examiner—Ted Kim
(74) Attorney, Agent, or Firm—Nixon & Vanderhye P.C.

(57) ABSTRACT

A gas turbine exhaust diffuser includes a substantially cylindrical outer casing provided with a forward casing flange; a substantially cylindrical liner spaced radially inwardly of, and secured to, the outer casing; and ceramic fiber insulation supported radially between the outer casing and the liner. A plurality of liner closeout segments are secured to the liner and include radial flange portions extending toward the forward casing flange. A plurality of spacer rings are supported between the forward casing flange and the liner closeout segments such that one of the spacer rings and the liner closeout segments present a flat face for direct attachment to an aft flange component of a gas turbine exhaust frame. This arrangement provides a thermally compliant load bearing interface between an air cooled gas turbine flange and an internally insulated diffuser casing flange in the high velocity section of the exhaust diffuser.

25 Claims, 10 Drawing Sheets

GAS TURBINE EXHAUST DIFFUSER

BACKGROUND OF THE INVENTION

This invention relates to gas turbine technology and, more specifically, to a liner system for internally insulated, high velocity gas turbine exhaust diffusers.

Current high velocity diffusers are externally insulated, smooth wall, hot shell structures. The hot shell structure typically comprises stainless steel sheets welded between machined rings. The forward connection between the turbine and high velocity diffuser typically requires some type of machined slip fit device to accommodate relative thermal growth. This type of flange requires machined parts and is prone to slippage, which can create a forward facing step. The step can catch fuel and allow that fuel to leak out of the connection and soak the external insulation.

The aft end of the high velocity diffuser is typically connected to an internally insulated, low velocity diffuser using some type of expansion joint. The expansion joint must accommodate the relative movement between the turbine and aft diffuser. Some gas turbines have used metal bellows expansion joints in the high velocity area or hot-to-cold insulated transitions. The reliability of the expansion joint over the years has not always been satisfactory. The expansion joints made with soft materials tend to wear out after two to five years and leak exhaust gas. Metal bellows tend to be very large but can accommodate only a small amount of relative movement.

Diffusers have also been designed with a hot to cold transition section. The forward section of the diffuser is externally insulated and the aft section is internally insulated. In between is a transition section with tapered external and tapered internal insulation.

BRIEF DESCRIPTION OF THE INVENTION

In accordance with the exemplary embodiment of this invention, we have provided a thermally compliant, load bearing interface between an air cooled gas turbine flange and an internally insulated diffuser casing flange in the high velocity section of the exhaust diffuser. The exhaust diffuser includes an outer casing comprised of rolled, carbon steel plate segments, with a forward flange (also comprised of one or more segments) welded to the forward edge of the casing. The casing is made up of a pair of 180° casing halves, adapted for attachment by, for example, welding. Each casing half may be made up of one or more segments. If plural segments are used, they are preferably welded along the seam joints between the segments. Circumferential ring stiffeners are welded at axially spaced locations on the exterior surface of the outer casing to rigidify and strengthen the casing.

Axially extending separator bars are welded to the interior surface of the outer casing, in circumferentially spaced relationship. In addition, one circumferentially extending separator bars are located at the forward end of the casing, interconnecting with the axially extending separator bars. These circumferential separator bars are also composed of a plurality of arcuate segments welded to the interior surface of the outer casing. The axial and circumferential separator bars serve to hold and thus maintain orientation of ceramic fiber insulation batts that are installed between the separator bars. The insulation protects the outer casing from the high gas turbine exhaust temperatures that may be in excess of 1200° F. The axial and circumferential separator bars are also each provided with radially extending threaded studs that are used to secure the additional components of the liner system.

Thermally compliant round "table tops" are arranged between, and in some instances straddling, the axially extending separator bars at a location spaced from the forward end of the casing. Each "table top" includes a round top platform supported by four legs welded to the interior surface of the outer casing. Each leg is provided with a threaded stud that projects upwardly through oversized holes in the table top. In other words, each top platform is slipped over the projecting studs. These "table tops" are aligned with apertures in the outer casing plate and facilitate the mounting of instrumentation, e.g., exhaust gas rakes and thermocouple radiation shields, used to monitor operation of the gas turbine.

A first layer of stainless steel liner sheets is installed over the separator bars and insulation, with circular cut-outs aligned with the "table tops" where appropriate. The cut-outs are smaller in diameter than the "table tops," so that the liner sheets partially overlie the "table tops," with the threaded studs on the legs of the table tops projecting not only through the table tops but also through the liner sheets. The liner sheets are also provided in the form of arcuate segments, with predetermined axial gaps between adjacent sheets. The liner sheets are formed with rows of oversized holes that permit the liner sheets to be arranged over the threaded studs on the separator bars, i.e., the threaded studs project through the holes in the liner sheets.

Liner hold down bars are located over the interior rows of holes on the liner sheets, i.e., all rows excluding the marginal rows along the side edges of the sheets. The hold down bars are also formed with holes to accommodate the threaded studs projecting through the liner sheets. Nut type fasteners are applied to the threaded studs projecting through the hold down bars and tightened, thereby securing the liner sheets in place.

The liner sheets are interconnected by liner splices that overlie the axial gaps between adjacent sheets. The liner splices also include widened areas with holes that align with the nearest "table tops" associated with adjacent liner sheets. Hold down bars are also installed over the liner splices and projecting studs, with nut type fasteners securing the assembly.

The hold down bars on the liner sheets and the liner splices terminate short of the forward end of the liner sheets, leaving a pair of threaded studs in each row (the rows are defined by the axial separator bars) uncovered by the hold down bars. Forward flange liner splices are installed over the front ends of the gaps between adjacent liner sheets, in axial alignment (and in abutment) with the liner splices, utilizing the available threaded studs. Each forward flange liner splice extends forward of the circumferentially extending separator bars and forward of the outer casing flange, terminating at a radially outwardly directed flange portion.

A first forward flange spacer ring, provided in the form of arcuate segments, is installed on the front face of the outer casing flange, extending radially inwardly of the casing flange to a location adjacent the back side of the radial flanges on the forward flange liner splices. The spacer segments are oriented so as to leave gaps between adjacent segments.

A second forward flange spacer ring is installed over the first forward flange spacer. This spacer is also provided as a plurality of arcuate segments, and the segments are arranged to overlap the seams between the segments of the first forward flange spacer. Cut-outs are provided to accommodate the radial flanges on the forward flange liner splices.

A third forward flange spacer ring is then installed over the second flange spacer, again in the form of arcuate segments, with the segments overlapping the seams of the segments in the second forward flange spacer.

The liner system is completed by the installation of a forward nosepiece liner closeout, again in the form of arcuate segments. Each closeout segment contains an axial portion that extends over the forward end of the liner sheets and forward flange liner splices, with holes to receive the first two rows of threaded studs projecting from the forward separator bars and liner plates, and through the forward flange liner splices and nosepiece segments, and again secured with nut-type fasteners. The nosepiece segments also each include a radially outwardly extending flange portion that overlaps the first forward flange spacer and terminates at a location radially inwardly of the third forward flange spacer. Remaining threaded studs projecting through the liner segments, in areas where there are no hold down bars, also receive nut-type fasteners.

Instrumentation rakes and/or radiation shields are installed and the casing halves joined together by welding.

The gas turbine exhaust frame aft flange includes a closeout component that includes a radially inwardly directed flange over which an extended radial flange portion is bolted. This extended radial flange is adapted to abut front faces of the casing nosepiece and third forward flange spacer. Securing bolts are then passed through the aft exhaust frame of the turbine, the extended radial flange portion of the frame, the first, second and third forward flange spacers, and the casing flange and secured by nut-type fasteners, thus establishing a hard, non-slip mounting between the aft exhaust frame and the diffuser.

Accordingly, in one aspect, the invention relates to a gas turbine exhaust diffuser comprising a substantially cylindrical outer casing provided with a forward casing flange; a substantially cylindrical liner spaced radially inwardly of, and secured to, the outer casing; ceramic fiber insulation supported radially between the outer casing and the liner; and a plurality of arcuate liner closeout segments secured to a forward end of the liner and including radial flange portions radially inward and axially forward of the forward casing flange.

In another aspect, the invention relates to a high velocity exhaust gas diffuser adapted for direct connection to an aft flange of a gas turbine exhaust frame comprising a substantially cylindrical outer casing provided with a forward casing flange; a plurality of arcuate liner sheets arranged circumferentially about the outer casing, and spaced radially inwardly of the casing; a plurality of axially extending separator bars between the outer casing and the liner sheets; ceramic fiber insulation batts supported radially between the outer casing and the liner; and a plurality of liner splices attached to the marginal edges of adjacent ones of liner sheets, thus overlapping axial gaps between the adjacent liner sheets.

In still another aspect, the invention relates to a gas turbine exhaust diffuser comprising a substantially cylindrical outer casing provided with a forward casing flange; a substantially cylindrical liner spaced radially inwardly of, and secured to, the outer casing, the liner comprised of a plurality of liner sheets arranged such that axially extending gaps are established between side edges of adjacent liner sheets; ceramic fiber insulation supported radially between the outer casing and the liner; and a plurality of liner splices secured to adjacent ones of the liner sheets, overlying the axially extending gaps, with a corresponding plurality of forward liner splices axially aligned with respective ones of the liner splices and including a forward flange portion extending radially outwardly toward the forward casing flange; and a plurality of forward nosepiece liner closeout segments secured along a forward edge of the liner and including radially inwardly extending flange portions located axially forward of the forward casing flange.

In still another aspect, the invention relates to a gas turbine and exhaust diffuser assembly comprising a gas turbine having an aft exhaust frame; a substantially cylindrical liner spaced radially inwardly of the outer casing flange; a plurality of arcuate closeout segments secured to a forward end of the substantially cylindrical liner, the closeout segments having radially outwardly extending flange portions; and a plurality of forward spacer rings located between the forward casing flange and the radially outwardly extending flange portions such that one of the forward spacer rings is co-planar with the radially outwardly extending flange portions; and wherein the one of the forward spacer rings and the radially outwardly extending flange portions are directly engaged with and secured to an aft flange component of the exhaust frame.

The invention will now be described in detail in conjunction with the drawings identified below.

DETAILED DESCRIPTION OF THE INVENTION

Figure 1:
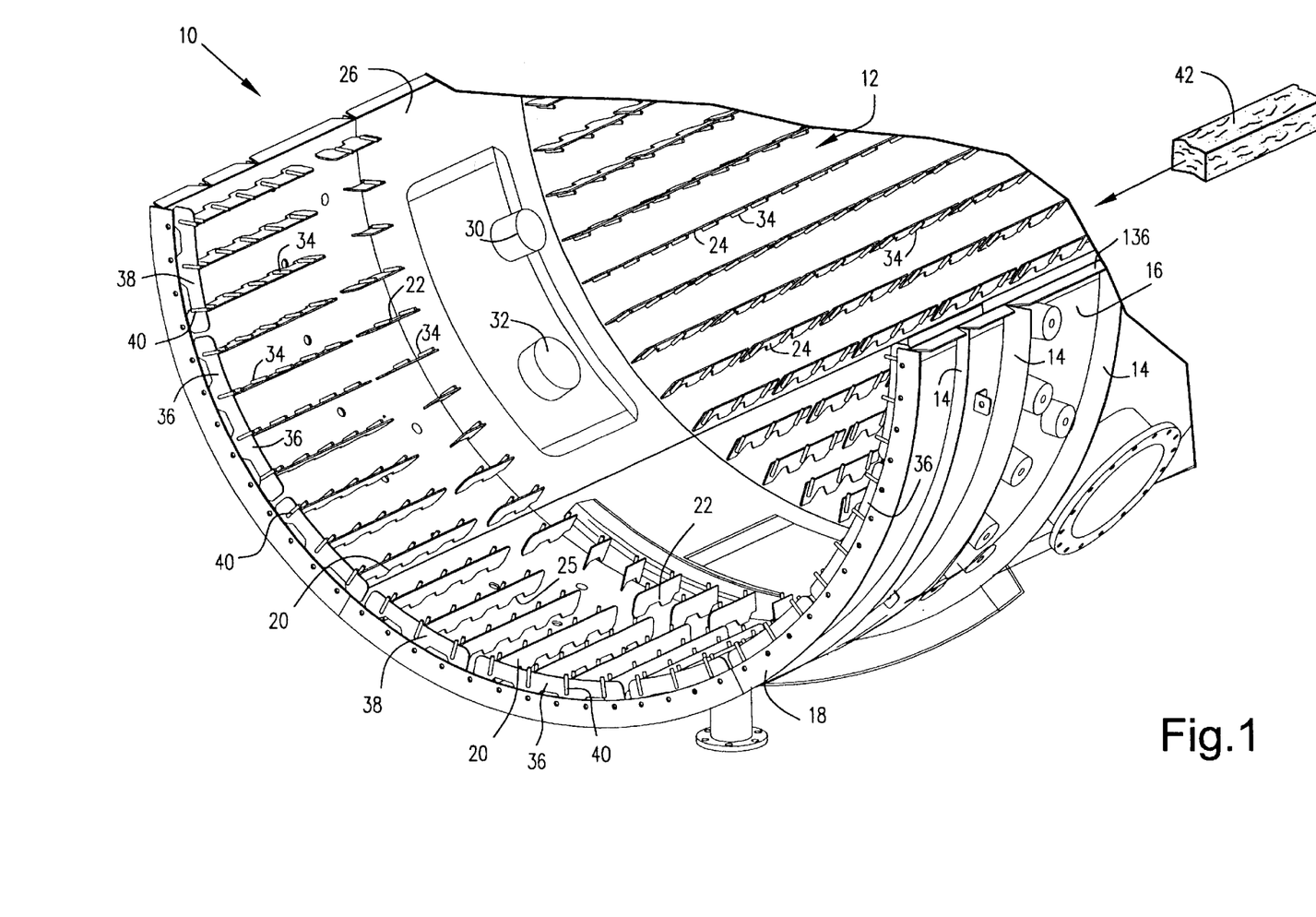
FIG. 1 is a partial perspective of a diffuser casing half in an early assembly stage in accordance with the invention.

With reference to FIG. 1, high velocity gas turbine exhaust diffuser in accordance with exemplary embodiment of the invention includes a pair of semi-cylindrical diffuser outer casing halves, one shown at 10 (hereinafter, "the outer diffuser casing"). The halves are substantially identical and, therefore, only one will be described in detail. The radially outer half casing may be a rolled carbon steel plate 12, with a plurality of ring stiffeners or ribs 14 welded to the outer surface 16 of the plate, axially spaced relative to each other. A forward casing flange 18 is welded to the end of the plate and facilitates attachment of the diffuser to the turbine exhaust frame as described further herein.

The outer casing plate 12 may be comprised of two 90° segments welded together, as shown, or it may comprise a single 180° segment adapted for connection to a second similar 180° segment to complete the casing. Similarly, the forward casing flange 18 may be composed of a single 180° flange element, or two or more arcuate segments (three shown in FIG. 1).

A plurality of groups of separator bars 20, 22, 24 are arranged in parallel, in the longitudinal direction of the outer diffuser casing 10, the bars welded to the interior surface 26 of the outer casing plate 12. The length of the separator bars vary depending on their axial location within the diffuser. For example, note that a first group of separator bars 20 are located adjacent the forward casing flange 18, while a second group of shorter separator bars 22 are axially aligned with the first group of bars 20, with spaces 28 therebetween provided for "table top" components 44 described further herein. Note that separator bars between the second group of separator bars 22 and the third group of separator bars 24 have been omitted for clarity. This is in an area where external pipe penetrations 30, 32 (shown in simplified form) extend radially through the wall of the outer casing plate 12.

It will be appreciated that the arrays of separator bars continue along substantially the entire length of the diffuser casing. It will also be appreciated that the separator bars 20, 22 and 24 are scalloped (i.e., cut-out) along their inner edges where the bars are welded to the casing. This scalloped or cut-out configuration (one shown at 25 in FIG. 1) allows for thermal expansion due to high temperatures.

Each separator bar 20, 22 and 24 is also provided with a plurality of threaded studs 34 that extend radially beyond the top of the respective bars and are used to facilitate attachment of additional diffuser liner components as described below.

Forward, transverse separator bars 36, 38 are welded to the plate 12 at the forward end of the casing. Note that each bar is in the form of an arcuate segment that engages forward edges of a group of the longitudinal separator bars 20. As shown, bars 36 extend across four of the longitudinal bars 20, while bars 38 extend across three of the longitudinal bars 20. This arrangement may vary however for different diffusers. The forward separator bars 36, 38 are otherwise similar to bars 20, including the incorporation of threaded studs 40. Insulation, preferably in the form of ceramic fiber batts (only one shown at 42 for simplicity sake), is installed between the separator bars 20, 22 and 24 along the length of the outer diffuser casing 10. The insulation protects the carbon steel outer diffuser casing 10 from exhaust gas temperatures in excess of 1200° F.

Figure 2:
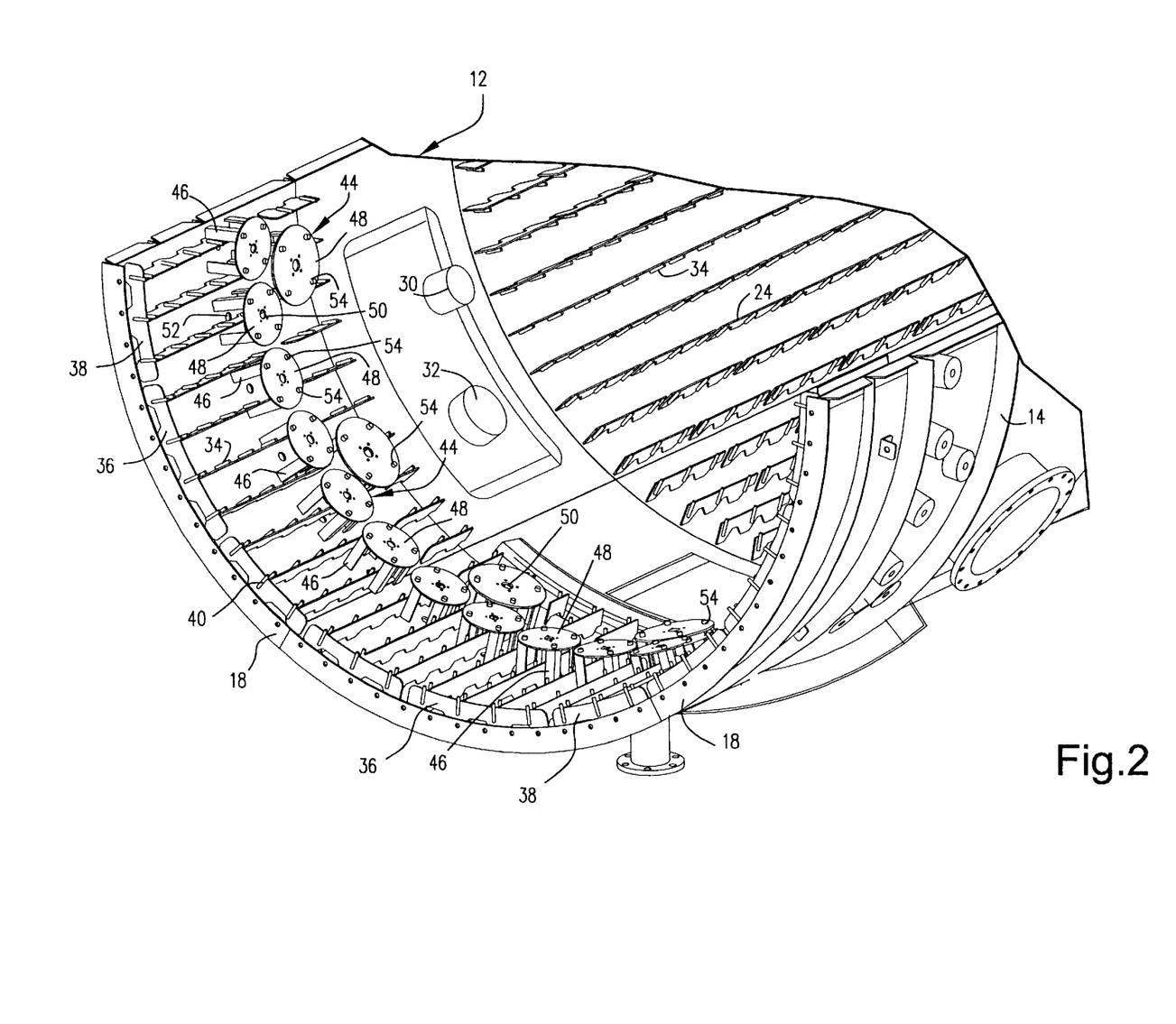
FIG. 2 is a partial perspective view of the diffuser casing half shown in FIG. 1, with additional components added.

With reference to FIG. 2, after the insulation is installed, thermally compliant "table tops" 44 are installed at the forward end of the outer diffuser casing to facilitate the mounting of instrumentation as described further below. These so-called "table tops" or instrumentation supports 44 each include a plurality (four) of legs 46 supporting a round top platform 48. The legs 46 are welded to the outer casing plate 12, with the top platforms 48 lying above the insulation. Note that center holes 50 in the top platforms are radially aligned with instrumentation apertures 52 in the outer casing plate 12. Each top platform 48 slips over four equally spaced studs 54 secured to the legs 46 and project 1–1½ inches into the gas exhaust flow path. Holes in the top platform that receive the studs are oversized to allow for thermal growth.

Figure 3:
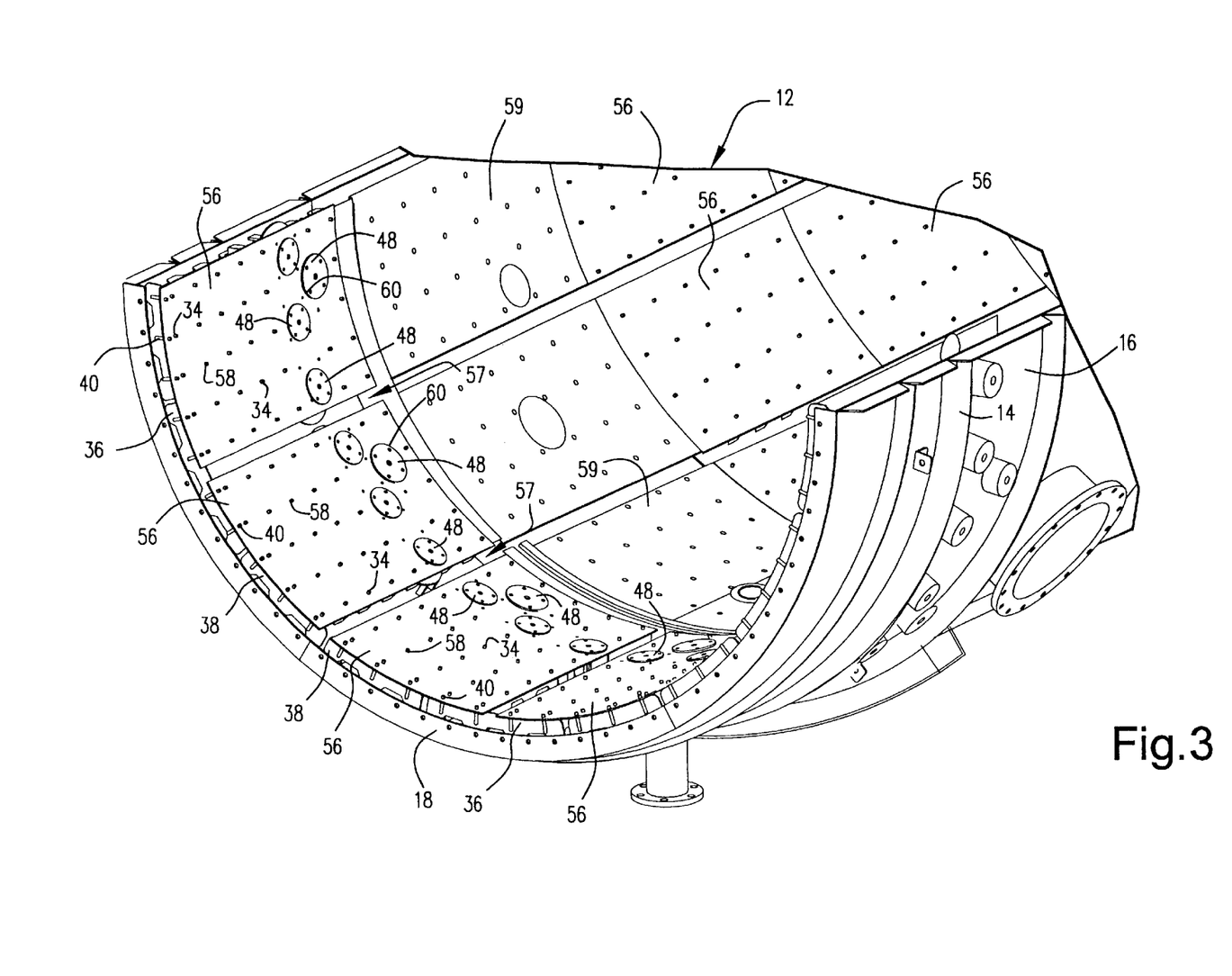
FIG. 3 is a partial perspective of the casing half illustrated in FIGS. 1 and 2 with liner sheet segments installed.

Turning to FIG. 3, a layer of stainless steel liner 56 is then added to the outer diffuser casing. The liner 56 is also provided in the form of arcuate sheets or segments, each extending over a group of the longitudinal separator bars 22, and overlapping adjacent pairs of forward transverse separator bars 36, 38. The liner sheets 56 are preferably not more than 4' wide, and, thus, the number of sheets may vary depending on diffuser size. The liner sheets are installed with axial gaps 57 extending between adjacent sheets. Oversized holes 58 in the liner sheets are aligned with and loosely receive the studs 34, 40 projecting upwardly from the axial and circumferential separator bars 20, 22 and 36, 38, respectively. In addition, the liner sheets have holes 60 that have diameters smaller than the diameters of the top platforms 48. In other words, the liner sheets 56 partially overlie the platforms 48, with the threaded studs on the "table top" legs also projecting through holes in the liner sheets. Liner sheets 59 of slightly different configuration are installed in the circumferentail region that incorporates the pipe penetrations 30, 32.

Figure 4:
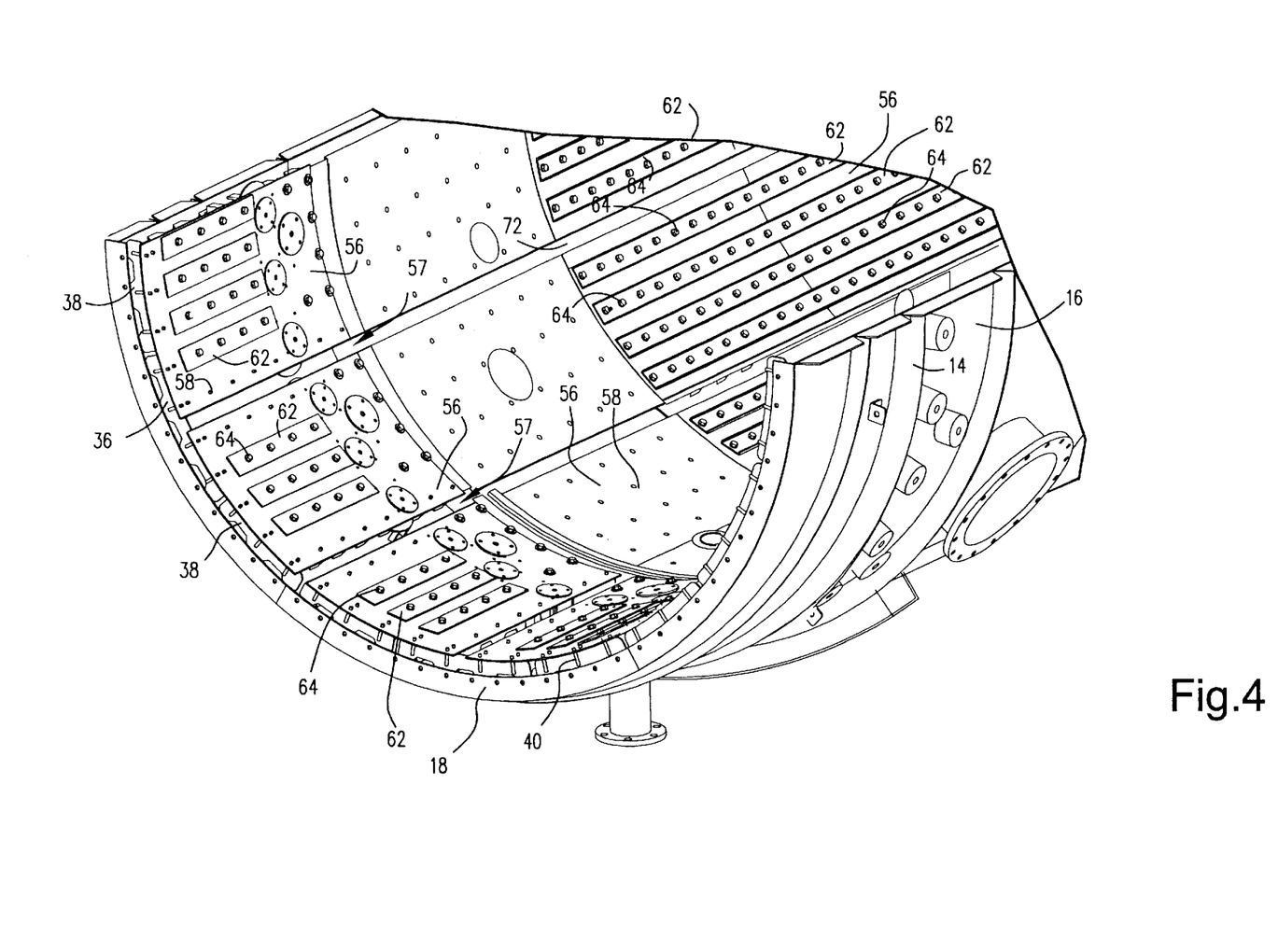
FIG. 4 is a partial perspective view of the diffuser casing half illustrated in FIGS. 1–3, with hold down bars installed.

Turning now to FIG. 4, a series of elongated rigid hold down bars 62 are secured over the liner sheets 56, specifically over the projecting studs 34 in the middle or interior three rows thereof and secured by nut type fasteners 64. In other words, hold down bars 62 are not applied to the studs 34 along the marginal edges of the sheets 56. The arrangement of hold down bars 62 in the forward end of the diffuser casing is different than in the remaining portions of the casing due to the presence of instrumentation "table tops" 44 and because the space required adjacent the forward casing flange 18 that accommodates additional hardware components as further described below. Thus, the majority of liner sheets 56 in the casing are held in place by hold down bars 62 that extend substantially the full length of the liner sheets.

Figure 5:
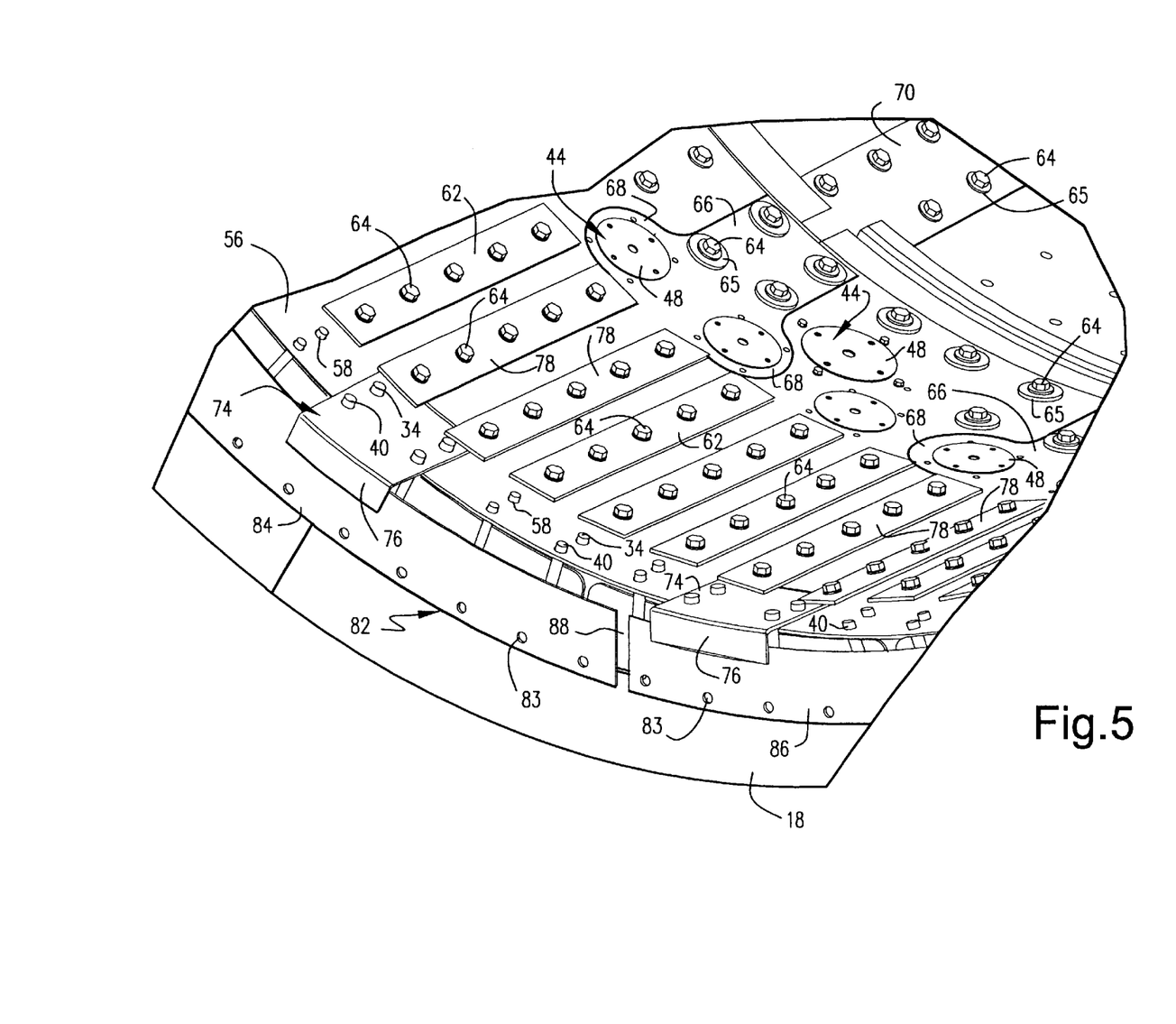
FIG. 5 is a partial perspective view of the diffuser casing half shown in FIGS. 1–4 with liner splices and first forward flange spacer ring installed.

As best seen in FIG. 5, liner splices 66 are added to bridge the axial gaps 57 between adjacent liner sheets 56, with widened areas at 68 that accommodate adjacent table top platforms 48. Liner splices 66 are provided with oversized holes that align with the threaded studs 34 along the marginal edges of the liner sheets 56. These liner splices 66 extend forwardly to a location just short of the first threaded studs in each row of studs 34 projecting through liner plates 56.

Similarly, elongated rectangular splices 70 are utilized along the length of the outer diffuser casing 10 to cover the axial gaps 72 (FIG. 4) between the liner plates 56 rearward of the pipe penetrations 30, 32.

Figure 9:
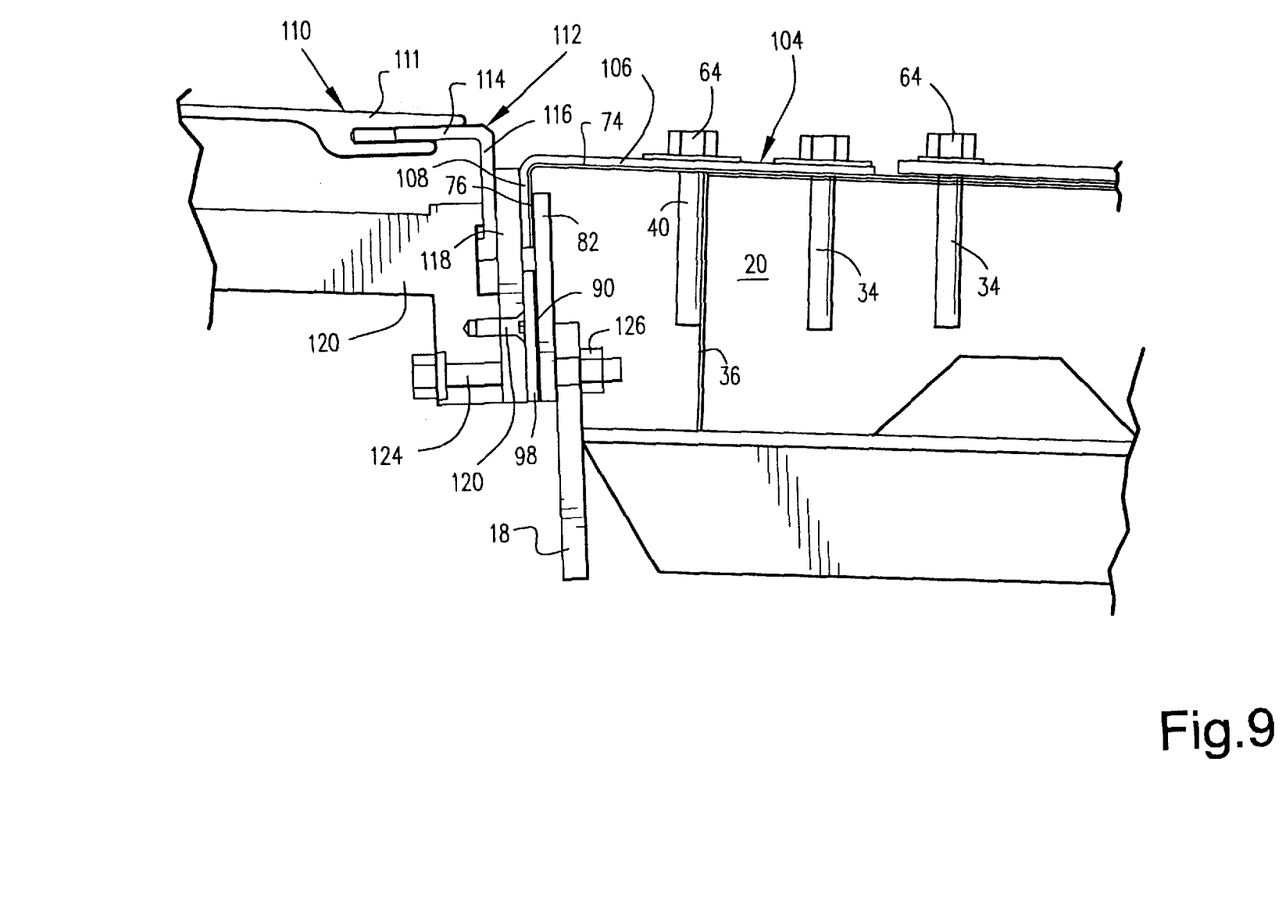
FIG. 9 is a cross section of the gas turbine frame aft flange and exhaust diffuser forward flange interface.

Forward flange liner splices 74 (preferably 11 ga. thick) are secured at the forward end of the liner splices 66, in axial alignment therewith, utilizing the first studs 34 in each row of studs as well as aligned studs 40 on the circumferential separator bars 36, 38. The forward flange liner splices 74 extend axially beyond the forward separator bars 36, 38 and the outer casing flange 18, as best seen in FIG. 9. The forward radial flange portion 76 of each forward flange liner splice, extends perpendicular to the remainder of the splice 74, and projects radially outwardly toward the casing flange 18.

Hold down bars 78 are added over the liner splices 66 (and studs 34) and are also secured by nut type fasteners 64. Nut-type fasteners 64 (preferably with oversized washers 65) are also employed at the rearward end of the splices 66, and in all other remaining areas of the liner sheets not amenable to the use of elongated hold down bars.

Note, however, that no fasteners are yet applied to the first two studs 34, 40 in each row of studs at the forward end of the outer diffuser casing.

A first forward flange spacer ring 82 is located on the front face of the casing flange 18 at its radially inner end, but its radially outer end remains rearwardly spaced from the forward flange portion 76 of the forward flange liner splices 74. This first spacer is preferably 0.500 inch thick stainless steel. Spacer ring 82 is preferably formed as discrete arcuate segments 84, 86, etc. that have gaps 88 between adjacent segments. Bolt holes 83 are used to secure the spacer ring 82 as described further herein.

The arcuate segments 84, 86, etc. preferably bridge the forward flange liner splices 66. In other words, the gaps 88 between the first forward flange spacer segments 84, 86 are staggered relative to the gaps between the liner plates 56 and preferably, the seams between the segments of the forward casing flange 18 as well.

Figure 6:
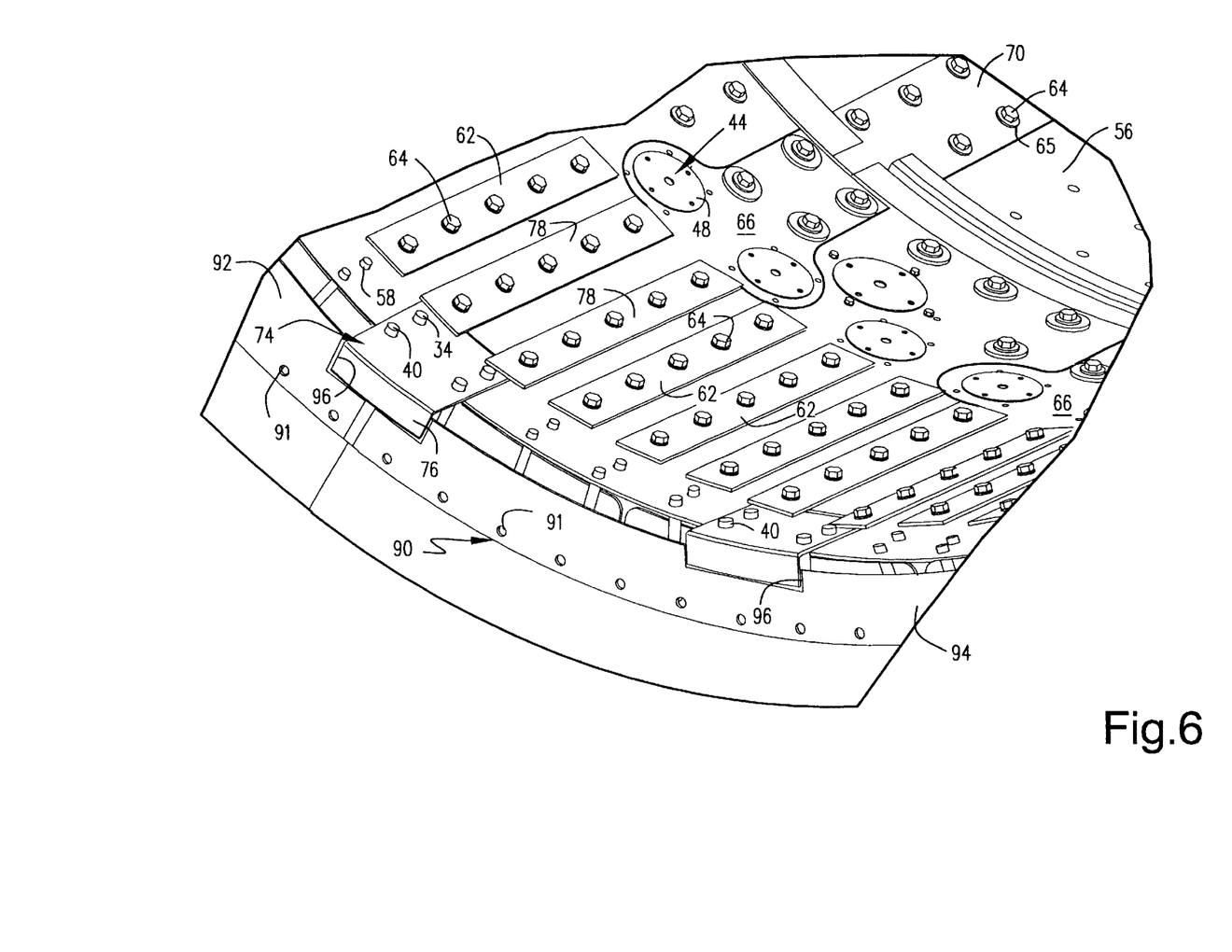
FIG. 6 is a partial perspective view of the diffuser casing half shown in FIGS. 1–5 with a second forward flange spacer ring installed.

With reference now to FIG. 6, a second forward flange spacer ring 90 is secured to the assembly, using bolt holes 91 aligned with the bolt holes 83 in the first forward flange spacer 82. This second spacer 90 is preferably 11 ga. thickness stainless steel, and is also preferably in the form of arcuate segments 92, 94, etc. that are arranged to overlap or bridge the seams between the segments 84, 86 of the first forward flange spacer 82. Cut-outs 96 are provided to accommodate the forward flange portions 76 of the forward flange liner splices 74.

Figure 7:
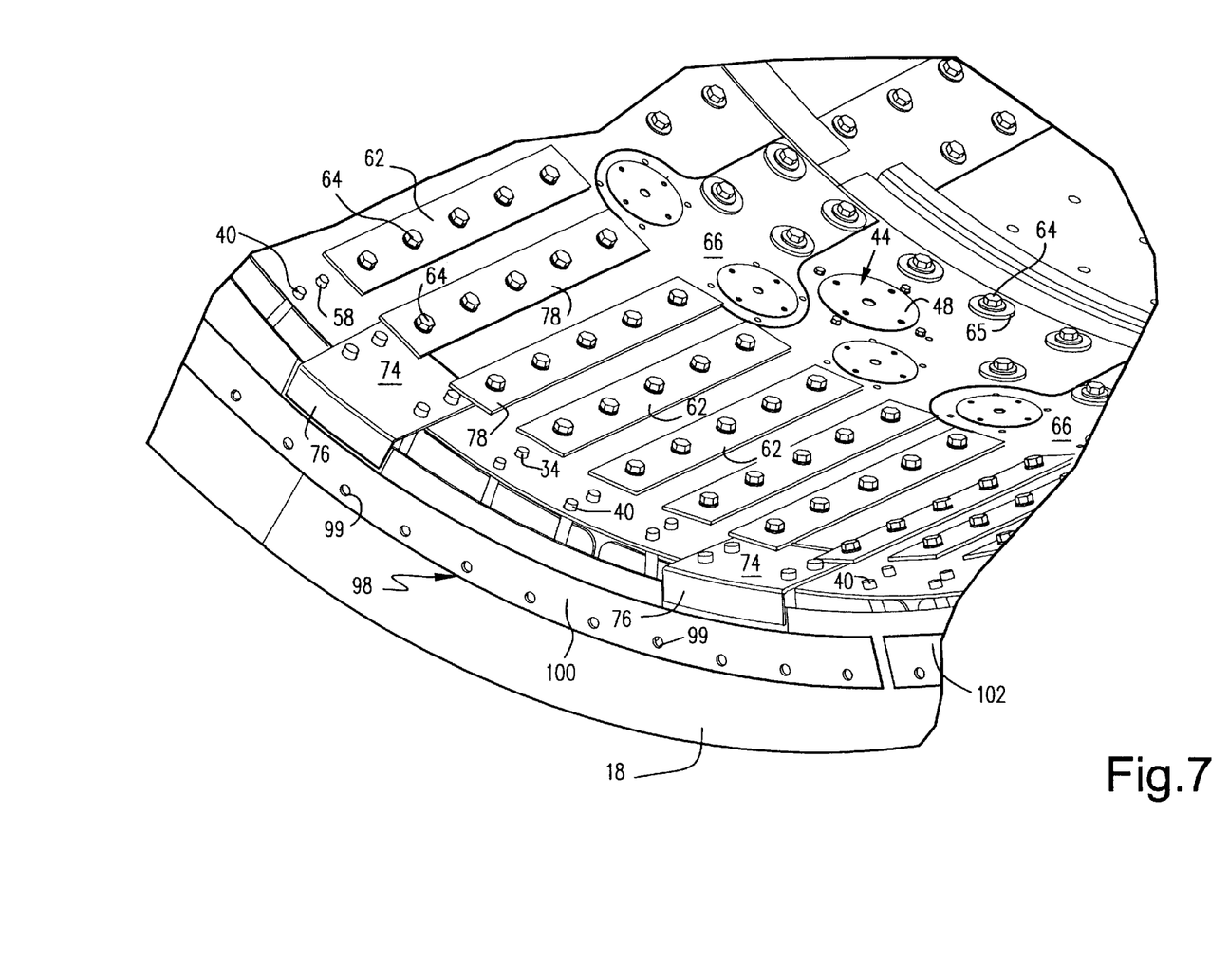
FIG. 7 is a partial perspective of the diffuser casing half shown in FIGS. 1–6 with a third forward flange spacer ring installed.

A third forward flange spacer ring 98 (see FIGS. 7 and 9) is secured to the first and second spacers, again using bolt holes 99 aligned with bolt holes 83 and 91. The third spacer 98 is also in the form of arcuate segments 100, 102, etc. that are staggered relative to the second forward flange spacer 90 to further minimize flange cooling or exhaust gas leakage. This third forward flange spacer 98 is preferably 0.3125 inch thick stainless steel, and note that the third spacer extends radially only to a location adjacent the radially inner edges of the forward flange portion 76 of the forward flange liner splices 74.

Figure 8:
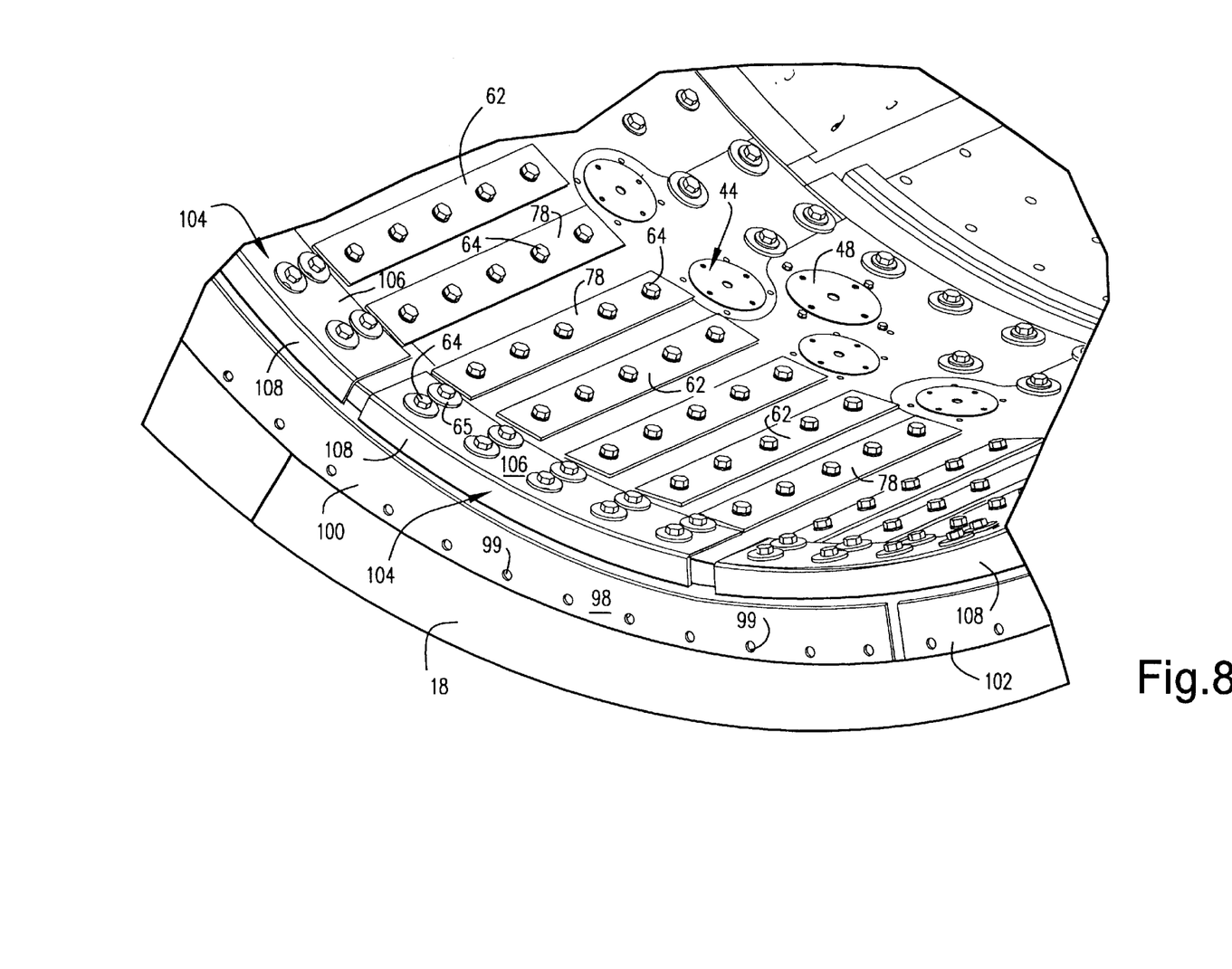
FIG. 8 is a partial perspective of a diffuser casing half shown in FIGS. 1–7 with liner closeouts installed.

Turning now to FIG. 8, forward nosepiece liner closeout segments 104 include axial plate portions 106 and radial flange portions 108. These closeout segments are secured over the forward ends of the liner plates 56 and forward flange liner splices 74, using the circumferential row of studs 40 projecting upwardly from the forward circumferential separator bars 36, 38 and the first stud in each row of studs 34 projecting upwardly from the axial separator bars 20. Nut-type fasteners 64 and washers 65 are utilized to secure the nosepiece liner closeout segments. The radial flange portions 108 of the closeout segments 104 overlap the first forward flange spacer ring 82, such that the flange portions 108 and the segments of the third spacer ring 98 present a flat face for hard non-slip attachment to the aft exhaust frame of the turbine as described further below (see FIG. 9).

The above described liner system withstands high exhaust gas velocity, high temperature, high flow swirl angle environment and fuel leakage. A significant part of the liner system is the overlapping liner sheet/splice configuration that stays substantially in the same circumferential plane while minimizing sheet to sheet gaps and steps. The liner system can be manufactured using rolled sheets with no machined parts required.

Figure 10:
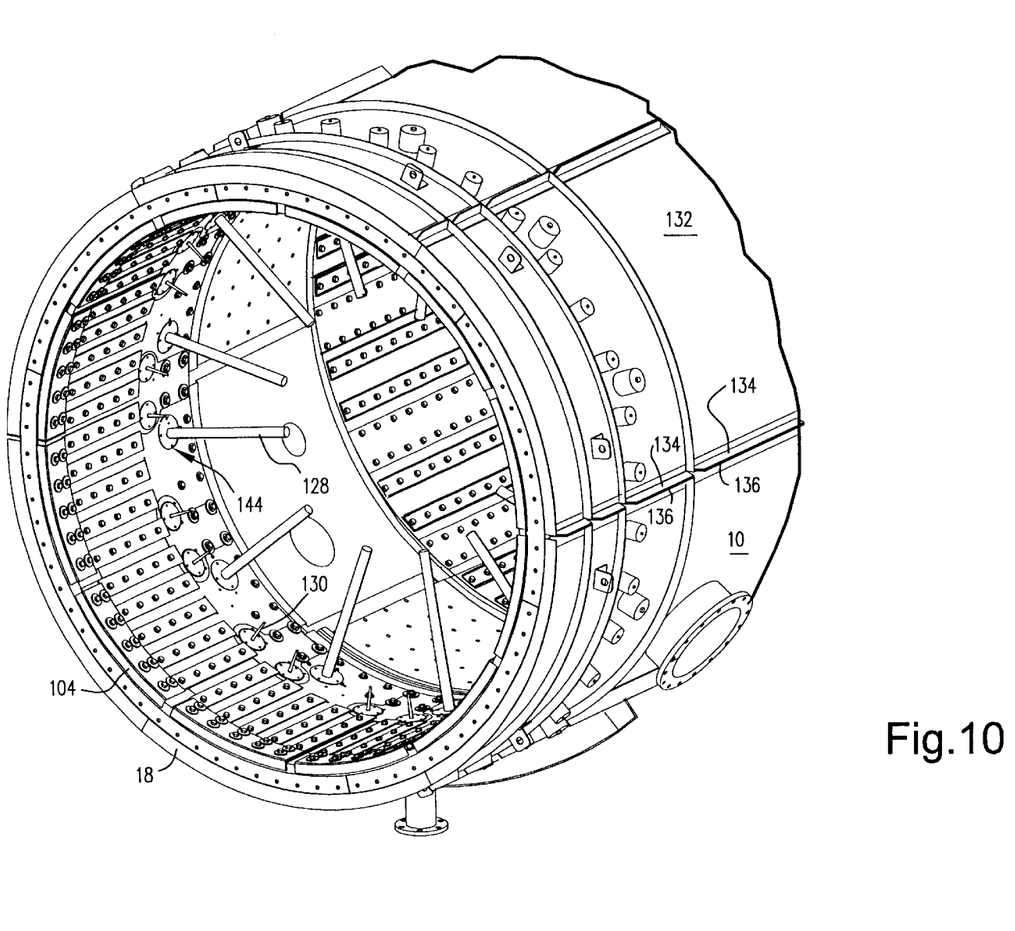
FIG. 10 is a partial perspective of a substantially completely assembled diffuser casing in accordance with the exemplary embodiment of the invention.

FIG. 10 illustrates a completed diffuser casing (prior to connection to the aft flange of the turbine exhaust frame) with field installed instrumentation rakes 128 and/or radiation shields 130 secured through the "table tops" 44, and with an upper outer diffuser casing half 132 welded to the lower outer diffuser casing half 10 via opposed flanges 134, 136 (FIGS. 1 and 10).

With reference to FIG. 9, the turbine exhaust frame 110 includes a liner fish mouth 111 that receives a closeout component 112 having an axially extending portion 114 seated in the fish mouth 111, and an aft radial flange portion 116 that faces the diffuser casing. A radially oriented annular plate, or extended radial aft flange portion 118, is bolted to the turbine exhaust frame 110 via bolts 120 such that one face engages the radial flange portion 116, and the opposite face engages both the radial flange portions 108 of the forward liner nosepiece closeout segments 104 and the third forward flange spacer 98. The diffuser casing is attached directly to aft flange component 118 of the turbine exhaust frame 110 by bolts (one shown at 124) extending through the turbine exhaust frame 120, extended radial aft flange component 118, the three forward spacer rings 82, 90 and 98 (and their respective aligned holes 83, 91 and 99) and the outer casing flange 18, with associated nut type fasteners 126.

This arrangement thus provides for a thermally compliant, load bearing interface between the high velocity, internally insulated diffuser casing and the turbine exhaust frame, without the use of expansion or machined slip joints. Thermal growth of the segmented liner plates is accommodated while providing a good seal to prevent the insulation from being aspirated into the flow path, and to prevent any fuel leakage behind the liner sheets and into the insulation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine exhaust diffuser comprising a substantially cylindrical outer casing provided with a forward casing flange;
   a substantially cylindrical liner spaced radially inwardly of, and secured to, said outer casing; ceramic fiber insulation supported radially between said outer casing and said liner; and
   a plurality of arcuate liner closeout segments secured to a forward end of said liner and including radial flange portions radially inward and axially forward of said forward casing flange.

2. The gas turbine exhaust diffuser of claim 1 wherein said liner is comprised of stainless steel.

3. The gas turbine exhaust diffuser of claim 1 and further comprising a plurality of axially extending separator bars circumferentially spaced about an interior surface of said outer casing, and wherein said ceramic fiber insulation is comprised of individual batts supported between adjacent pairs of said separator bars.

4. The gas turbine exhaust diffuser of claim 3 wherein each of said separator bars is provided with a plurality of threaded studs projecting radially inwardly from said separator bar, and wherein said liner is provided with a plurality of apertures aligned with said threaded studs such that said threaded studs project through said apertures.

5. The gas turbine exhaust diffuser of claim 4 wherein fasteners are applied to said threaded studs to thereby secure said liner to said separator bars and said outer housing.

6. The gas turbine exhaust diffuser of claim 5 wherein said liner is comprised of a plurality of liner sheets arranged such that axially extending gaps are established between side edges of adjacent liner sheets.

7. The gas turbine exhaust diffuser of claim 6 wherein liner splices are secured to adjacent ones of said liner sheets, overlying said axially extending gaps.

8. The gas turbine exhaust diffuser of claim 7 and further comprising a forward liner splice axially aligned with each of said liner splices and including a forward flange portion extending radially outwardly toward said forward casing flange.

9. The gas turbine exhaust diffuser of claim 8 wherein portions of said liner closeout segments overlie said forward flange portion of each said forward liner splices, and wherein a plurality of spacer rings are located axially forward of said forward casing flange, such that at least one of said spacer rings and said liner closeout segments lie in the same vertical plane, adapted for direct engagement with an aft flange of an exhaust frame of a gas turbine.

10. A high velocity exhaust gas diffuser adapted for direct connection to an aft flange of a gas turbine exhaust frame comprising:
- a substantially cylindrical outer casing provided with a forward casing flange;
- a plurality of arcuate liner sheets arranged circumferentially about said outer casing, and spaced radially inwardly of said casing; a plurality of axially extending separator bars between said outer casing and said liner sheets;
- ceramic fiber insulation batts supported radially between said outer casing and said liner sheets; and
- a plurality of arcuate liner splices attached to marginal edges of adjacent ones of said liner sheets, thus overlapping axial gaps between the adjacent liner sheets.

11. The high velocity exhaust gas diffuser of claim 10 wherein said outer casing is comprised of a carbon steel alloy and said liner sheets are comprised of stainless steel.

12. The high velocity exhaust gas diffuser of claim 10 wherein said separator bars are welded along one radially outer edge to said outer casing and wherein radially inner edges of said axially extending separator bars are provided with radially projecting threaded studs that pass through said liner sheets and said liner splices.

13. The high velocity exhaust gas diffuser of claim 12 wherein a plurality of elongated, rigid hold down bars are arranged on each of said liner sheets, with some of said threaded studs projecting through said hold down bars, and wherein fasteners are secured to said threaded studs.

14. The high velocity exhaust gas diffuser of claim 12 and further comprising a plurality of circumferentially extending separator bars located axially forward of said axially extending separator bars, said circumferentially extending separator bars also provided with radially projecting threaded studs.

15. The high velocity exhaust gas diffuser of claim 14 and further comprising a forward liner splice axially aligned with each of said liner splices and including a forward flange portion extending radially outwardly toward said forward casing flange.

16. The high velocity exhaust gas diffuser of claim 15 and further comprising a plurality of arcuate liner closeout segments located circumferentially about said outer casing, portions of which overlie said forward flange portion of each said forward liner splice; and wherein a plurality of spacer rings are located axially forward of said forward casing flange, such that at least one of said spacer rings and said liner closeout segments lie in the same vertical plane; and further wherein certain of said threaded studs project through said forward liner splices and through said liner closeout segments and receive nut-type fasteners thereon.

17. The high velocity exhaust gas diffuser of claim 16, wherein said plurality of spacer rings include a first spacer ring engaged with a front face of said forward casing flange, said first spacer ring comprising plural arcuate segments.

18. The high velocity exhaust gas diffuser of claim 17 and wherein said plurality of spacer rings include a second spacer ring engaged with said first spacer ring.

19. The high velocity exhaust gas diffuser of claim 18 and wherein said plurality of spacer rings include a third spacer ring engaged with said second spacer ring, said third spacer ring vertically radially aligned with said liner closeout segments, such that said third spacer ring and said liner closeout segments provide a flat face for attachment to an aft flange of a gas turbine exhaust frame.

20. The high velocity exhaust gas diffuser of claim 10 and including a plurality of circumferentially arranged instrumentation supports exposed through apertures in said liner sheets.

21. The high velocity exhaust gas diffuser of claim 20 wherein each support comprises a round platform supported on four legs welded to the outer casing.

22. The high velocity exhaust gas diffuser of claim 21 wherein said legs are provided with threaded studs projecting through said platforms and through said liner sheets.

23. A gas turbine exhaust diffuser comprising a substantially cylindrical outer casing provided with a forward casing flange;
- a substantially cylindrical liner spaced radially inwardly of, and secured to, said outer casing, said liner comprised of a plurality of liner sheets arranged such that axially extending gaps are established between side edges of adjacent liner sheets;
- ceramic fiber insulation supported radially between said outer casing and said liner; and
- a plurality of liner splices secured to adjacent ones of said liner sheets, overlying said axially extending gaps, with a corresponding plurality of forward liner splices axially aligned with respective ones of said liner splices and including a forward flange portion extending radially outwardly toward said forward casing flange; and
- a plurality of forward nosepiece liner closeout segments secured along a forward edge of said liner and including radially inwardly extending flange portions located axially forward of said forward casing flange.

24. A gas turbine and exhaust diffuser assembly comprising:
- a gas turbine having an exhaust frame;
- an exhaust diffuser comprising a substantially cylindrical outer casing provided with a forward casing flange;
- a substantially cylindrical liner spaced radially inwardly of said outer casing;
- a plurality of arcuate closeout segments secured to a forward end of said substantially cylindrical liner, said closeout segments having radially outwardly extending flange portions; and
- a plurality of forward spacer rings located between said forward casing flange and said radially outwardly extending flange portions such that one of said forward spacer rings is co-planar with said radially outwardly extending flange portions; and
- wherein said one of said forward spacer rings and said radially outwardly extending flange portions are directly engaged with and secured to an aft flange component of said gas turbine exhaust frame.

25. The gas turbine and exhaust diffuser assembly of claim 24 wherein a plurality of fasteners pass through said aft flange component of said exhaust frame, said plurality of forward spacer rings and said forward casing flange.

* * * * *